United States Patent
Inagaki et al.

(10) Patent No.: US 12,508,537 B2
(45) Date of Patent: Dec. 30, 2025

(54) ABSORBER AGENT FOR CARBON DIOXIDE DERIVED FROM ATMOSPHERE

(71) Applicant: KOBE GAKUIN EDUCATIONAL FOUNDATION, Kobe (JP)

(72) Inventors: Fuyuhiko Inagaki, Kobe (JP); Ryo Murakami, Kobe (JP); Hikari Kawamitsu, Kobe (JP)

(73) Assignee: Kobe Gakuin Educational Foundation, Kobe (JP)

(*) Notice: Subject to any disclaimer, the term of this patent is extended or adjusted under 35 U.S.C. 154(b) by 325 days.

(21) Appl. No.: 18/547,240

(22) PCT Filed: Jan. 26, 2022

(86) PCT No.: PCT/JP2022/002780
§ 371 (c)(1),
(2) Date: Aug. 21, 2023

(87) PCT Pub. No.: WO2022/176534
PCT Pub. Date: Aug. 25, 2022

(65) Prior Publication Data
US 2024/0123397 A1    Apr. 18, 2024

(30) Foreign Application Priority Data
Feb. 22, 2021    (JP) .................. 2021-026634

(51) Int. Cl.
*B01D 53/22* (2006.01)
*B01D 53/14* (2006.01)

(52) U.S. Cl.
CPC ..... *B01D 53/1493* (2013.01); *B01D 53/1418* (2013.01); *B01D 53/1425* (2013.01);
(Continued)

(58) Field of Classification Search
CPC ............ B01D 53/1493; B01D 53/1418; B01D 53/1425; B01D 2252/103;
(Continued)

(56) References Cited

U.S. PATENT DOCUMENTS 2,418,944 A * 4/1947 Kaiser ................. C07D 251/46
544/212
6,784,320 B2    8/2004 Mimura et al.
(Continued)

FOREIGN PATENT DOCUMENTS

JP    S48-079780 A    10/1973
JP    S56-090299 A    7/1981
(Continued)

OTHER PUBLICATIONS

Baciocchi et al., "Process Design and Energy Requirements for the Capture of Carbon Dioxide from Air," *Chemical Engineering and Processing*, 45(12): 1047-1058 (2006).
(Continued)

*Primary Examiner* — Anthony R Shumate
(74) *Attorney, Agent, or Firm* — Leydig, Voit & Mayer, Ltd.

(57) ABSTRACT

The present invention aims to provide a carbon dioxide absorbent that can efficiently absorb, fix, and simply separate and recover carbon dioxide in the air. The present invention relates to an atmospheric carbon dioxide absorbent consisting of an amine selected from the group consisting of m-xylylene diamine, benzylamine, phenethylamine, p-methoxybenzylamine, and p-trifluoromethylbenzylamine, and water, and having the amine content of 1 to 50 wt % with respect to the total amount. The present invention also relates to a method for generating carbon dioxide which uses the aforementioned carbon dioxide absorbent and is simple and superior in energy efficiency.

7 Claims, 4 Drawing Sheets

(52) U.S. Cl.
CPC .......... *B01D 2252/103* (2013.01); *B01D 2252/20436* (2013.01); *B01D 2252/504* (2013.01); *B01D 2257/504* (2013.01)

(58) Field of Classification Search
CPC .... B01D 2252/20436; B01D 2252/504; B01D 2257/504
See application file for complete search history.

(56) References Cited

U.S. PATENT DOCUMENTS

| | | | |
|---|---|---|---|
| 7,316,737 | B2 | 1/2008 | Mimura et al. |
| 7,842,126 | B1* | 11/2010 | Dilmore ............... B01D 53/80 423/232 |
| 8,845,787 | B2 | 9/2014 | Jacquin et al. |
| 9,079,134 | B2 | 7/2015 | Ogino |
| 2003/0045756 | A1 | 3/2003 | Mimura et al. |
| 2004/0092774 | A1 | 5/2004 | Mimura et al. |
| 2008/0286474 | A1* | 11/2008 | Chevalier ............... C04B 28/14 524/415 |
| 2009/0292075 | A1* | 11/2009 | Tamai ................... C08L 33/14 525/221 |
| 2010/0037404 | A1* | 2/2010 | Koike ................... A61Q 5/10 8/423 |
| 2010/0125956 | A1* | 5/2010 | Koike ................... A61K 8/39 8/429 |
| 2011/0176981 | A1 | 7/2011 | Jacquin et al. |
| 2011/0185901 | A1 | 8/2011 | Jacquin et al. |
| 2012/0160099 | A1* | 6/2012 | Shoji ................ B01D 53/1475 96/144 |
| 2013/0139695 | A1* | 6/2013 | Chang ............... B01D 53/1481 96/235 |
| 2014/0096684 | A1 | 4/2014 | Ogino |
| 2018/0272267 | A1* | 9/2018 | Kondo ................ C08F 214/06 |
| 2019/0083921 | A1* | 3/2019 | Suzuki ................ C07D 241/04 |
| 2023/0323509 | A1* | 10/2023 | Wyrsta .................. C22B 3/22 423/158 |
| 2025/0019253 | A1* | 1/2025 | Novek ................. C01F 11/08 |
| 2025/0214856 | A1* | 7/2025 | Novek ................. C01F 5/40 |

FOREIGN PATENT DOCUMENTS

| | | |
|---|---|---|
| JP | 2002-126439 A | 5/2002 |
| JP | 2003-053134 A | 2/2003 |
| JP | 2005-040683 A | 2/2005 |
| JP | 2011-528993 A | 12/2011 |
| JP | 2012-250205 A | 12/2012 |
| JP | 2017-031046 A | 2/2017 |
| JP | 2017-031062 A | 2/2017 |
| JP | 2019-127417 A | 8/2019 |

OTHER PUBLICATIONS

Iijima et al., "$CO_2$ Recovery Technology from Combustion Exhaust Gas," *Kagaku Kogaku*, 77(5): 300-303 (2013).

Inagaki et al., "$CO_2$-Selective Absorbents in Air: Reverse Lipid Bilayer Structure Forming Neutral Carbamic Acid in Water without Hydration," *J. Am. Chem. Soc.*, 139(13): 4639-4642 (2017).

Kiani et al., "Techno-Economic Assessment for $CO_2$ Capture from Air Using a Conventional Liquid-Based Absorption Process," *Front. Energy Res.*, 8: 92 (2020).

Japan Patent Office, International Search Report in International Patent Application No. PCT/JP2022/002780 (Mar. 22, 2022).

Japan Patent Office, International Preliminary Report on Patentability in International Patent Application No. PCT/JP2022/002780 (May 15, 2023).

* cited by examiner

FIG. 4

ABSORBER AGENT FOR CARBON DIOXIDE DERIVED FROM ATMOSPHERE

TECHNICAL FIELD

The present invention relates to an atmospheric carbon dioxide absorbent consisting of m-xylylene diamine and water. The present invention also relates to a method for generating carbon dioxide, including leaving a carbon dioxide absorbent to absorb carbon dioxide in the air, recovering the generated [3-(aminomethyl)benzyl]carbamic acid by solid-liquid separation, and subjecting same to an acid treatment or a heat treatment. Also, the present invention relates to an atmospheric carbon dioxide absorbent consisting of benzylamine, phenethylamine, p-methoxybenzylamine or p-trifluoromethylbenzylamine, and water.

BACKGROUND ART

In recent years, from the perspective of global environmental protection, active discussions have been conducted as to the reduction of emissions of carbon dioxide, which is a greenhouse gas. However, truly effective solutions have not yet been found. As a solution to this problem, carbon dioxide capture and storage (CCS) technique including efficiently recovering high-concentration carbon dioxide from the exhaust gas discharged from thermal power plants and the like, and burying and storing same underground or in the sea, has been actively studied in recent years (Non-patent Document 1). However, the CCS requires significant investment in large scale equipment and the like, and is not a practical solution at civilian levels (individual levels). Moreover, since exhaust gas and the like also contain high concentrations of toxic gases such as nitrogen oxides and sulfur oxides in addition to carbon dioxide, many problems are left to solve before utilizing carbon dioxide recovered together with these toxic gases as a carbon source (Patent Documents 1, 2).

On the other hand, if carbon dioxide in the air (the ratio of carbon dioxide in the air is usually only 0.04 to 0.05 v/v %) could be used simply and effectively as a carbon source, it can be a truly effective solution. In relation to this, a technique for recovering carbon dioxide from the air (DAC: Direct Air Capture) is beginning to attract attention. As a method for collecting only carbon dioxide in the air, a method including making an aqueous sodium hydroxide solution absorb carbon dioxide in the air to obtain an aqueous sodium carbonate solution, reacting same with a calcium hydroxide slurry to obtain calcium carbonate in a solid state, and heating same at 900° C. to generate carbon dioxide, and a method using an aqueous hydroxyethylamine solution as a carbon dioxide absorbent are heretofore known (Non-patent Document 2, Non-patent Document 3). However, the method using an aqueous sodium hydroxide solution has problems that sodium hydroxide used as a carbon dioxide absorbent is a hazardous substance and that four steps are required from absorption to generation of carbon dioxide. In addition, since the state of an aqueous solution is maintained even after absorption of carbon dioxide in the both methods, generation of carbon dioxide requires extra energy for heating water (for example, high temperature conditions (about 900° C.)), and reduction of energy poses a problem.

Recently, the present inventors have found that specific substituted alkylamines can selectively absorb and release carbon dioxide in the air (Patent Documents 3, 4, 5). In this method, the specific substituted alkylamine alone is used as the carbon dioxide absorbent instead of an aqueous solution thereof, so that the energy for heating water is not required when the absorbed carbon dioxide is released. Therefore, the method has the advantage that carbon dioxide can be efficiently generated under mild temperature conditions. In order to efficiently recover and reuse carbon dioxide contained at low concentrations in the air, it is necessary to further enhance the carbon dioxide absorption (recovery) performance of the carbon dioxide absorbent.

CITATION LIST

Patent Documents

[Patent Document 1]
  JP-A-2003-53134
[Patent Document 2]
  JP-A-2005-40683
[Patent Document 3]
  JP-A-2017-31046
[Patent Document 4]
  JP-A-2017-31062
[Patent Document 5]
  JP-A-2019-127417

Non-Patent Documents

[Non-Patent Document 1]
  Iijima, M. and Nakatani, S., Kagaku Kogaku, 2013, Vol. 77, pages 300-303
[Non-Patent Document 2]
  Baciocchi, R. Storti, G. and Mazzotti, M., Chemical Engineering and Processing, 2006, Vol. 45, pages 1047-1058.
[Non-Patent Document 3]
  Kiani, A. Jiang, K. and Feron, P., frontiers in Energy Research, 2020, Vol. 8, Article 92.

SUMMARY OF INVENTION

Problems to be Solved by the Invention

The present invention aims to provide a carbon dioxide absorbent capable of efficiently absorbing and fixing carbon dioxide, which is present only at a low concentration in the air, at room temperature under atmospheric pressure, as well as effectively utilize carbon dioxide as a carbon source by causing a timely release of carbon dioxide under mild conditions with high energy efficiency from a carbon dioxide absorbent after fixation of carbon dioxide.

Means of Solving the Problems

Under such circumstances, the present inventors have conducted intensive studies and found that a composition consisting of m-xylylene diamine and water and having an m-xylylene diamine content of 1 to 50 wt % with respect to the total amount can provide a superior carbon dioxide absorbent capable of more remarkably and efficiently absorbing and fixing carbon dioxide in the air than m-xylylene diamine alone. In addition, the present inventors have found that [3-(aminomethyl)benzyl]carbamic acid formed by absorbing and fixing carbon dioxide in the carbon dioxide absorbent is unexpectedly precipitated as a non-hydrate solid in the aforementioned composition, and can be isolated easily and efficiently by solid-liquid separation without including water, whereby the fixed carbon dioxide can be generated with high energy efficiency. Furthermore, the present inventors have found that benzylamine, phenethylamine, p-methoxybenzylamine, and p-trifluoromethylbenzylamine can also remarkably and efficiently absorb and fix carbon dioxide in the air like m-xylylene diamine, which resulted in the completion of the present invention.

That is, the present invention provides the following.

[1] An atmospheric carbon dioxide absorbent consisting of an amine selected from the group consisting of m-xylylene diamine, benzylamine, phenethylamine, p-methoxybenzylamine, and p-trifluoromethylbenzylamine, and water, and having the amine content of 1 to 50 wt % with respect to the total amount.

[2] The carbon dioxide absorbent of the above-mentioned [1], wherein the amine is m-xylylene diamine.

[3] The carbon dioxide absorbent of the above-mentioned [1], wherein the amine is benzylamine.

[4] The carbon dioxide absorbent of the above-mentioned [1], wherein the amine is phenethylamine.

[5] The carbon dioxide absorbent of the above-mentioned [1], wherein the amine is p-methoxybenzylamine.

[6] The carbon dioxide absorbent of the above-mentioned [1], wherein the amine is p-trifluoromethylbenzylamine.

[7] The carbon dioxide absorbent of any of the above-mentioned [1] to [6], wherein the amine content is 3 to 30 wt %.

[8] The carbon dioxide absorbent of any of the above-mentioned [1] to [6], wherein the content of the amine is 3 to 15 wt %.

[9] The carbon dioxide absorbent of any of the above-mentioned [1] to [6], wherein the content of the amine is 3 to 6 wt %.

[10] A method for generating carbon dioxide, comprising a step of leaving the carbon dioxide absorbent of any of the above-mentioned [1] to [9] to cause absorption of carbon dioxide in the air and recovering the precipitated carbamic acid derivative by solid-liquid separation, and a step of reacting the recovered carbamic acid derivative with an acid or heating the recovered carbamic acid derivative.

[11] The method of the above-mentioned [10], wherein the carbon dioxide absorbent of the above-mentioned [2] or any of [7] to [9] is used, and the carbamic acid derivative is [3-(aminomethyl)benzyl]carbamic acid.

[12] The method of the above-mentioned [11], wherein the acid is selected from the group consisting of hydrochloric acid, perchloric acid, phosphoric acid, oxalic acid, malonic acid, malic acid, glycolic acid, and trifluoroacetic acid.

[13] The method of the above-mentioned [11], wherein the heating is carried out at about 120-140° C.

[14] The method of any of the above-mentioned [11] to [13], wherein water is added to m-xylylene diamine recovered by the method of any of the above-mentioned [11] to [13] to regenerate the carbon dioxide absorbent of the above-mentioned [2] and it is used as a carbon dioxide absorbent.

Effect of the Invention

The carbon dioxide absorbent of the present invention has a high carbon dioxide absorption capacity compared to known carbon dioxide absorbents and thus has the advantage of being able to absorb and fix even atmospheric carbon dioxide, which exists only at a low concentration in the air, efficiently at room temperature and under atmospheric pressure. In addition, since the carbamic acid derivative or bicarbonate produced (precipitated) after fixation of carbon dioxide is extremely hydrophobic and can be isolated without containing water by a simple operation (solid-liquid separation). By not containing water, carbon dioxide can be released with high energy efficiency under mild conditions and effectively used as a carbon source. Therefore, according to the present invention, a carbon dioxide absorbent, which is friendly to the global environment in that carbon dioxide in the air can be efficiently absorbed and fixed and air-derived carbon dioxide can be released timely while minimizing the use of external energy (heating, pressurization, stirring, etc.), and a method for effectively utilizing carbon dioxide thereby can be provided.

BRIEF DESCRIPTION OF DRAWINGS

FIG. 1

At room temperature, aqueous solutions of m-xylylene diamine (7.58 mmol) at each concentration (1, 3, 6, 13, 23, 30, 50, and 75 wt %) and m-xylylene diamine itself (7.58 mmol; 100 wt %) were placed separately in cylindrical reaction containers (diameter 5.5 cm, height 9 cm or 13 cm), nitrogen/carbon dioxide mixed gas (carbon dioxide concentration: about 1 vol %) was supplied to the reaction containers by a mass flow controller (hereinafter referred to as "MFC") at a flow rate of 25 mL/min, and FIG. 1-1 shows changes in the carbon dioxide concentration (ppm) over time in a rectangular container (length 6 cm, width 6 cm, height 13 cm) provided on the exit (outlet) side. FIG. 1-2 shows a partially enlarged view of FIG. 1-1.

FIG. 2

At room temperature, an aqueous solution of m-xylylene diamine (7.58 mmol) at 6 wt % concentration was placed in a cylindrical reaction container (diameter 5.5 cm, height 9 cm or 13 cm), air (carbon dioxide concentration: about 450 ppm) was supplied to the reaction containers by MFC at a flow rate of 250 mL/min.

FIG. 3

FIG. 4

An aqueous solution of m-xylylene diamine, benzylamine, phenethylamine, p-methoxybenzylamine, or p-trifluoromethylbenzylamine at 6 wt % concentration was each placed in a reaction container, air (carbon dioxide concentration: about 450 ppm) was supplied to the reaction containers by MFC at a flow rate of 250 mL/min.

DESCRIPTION OF EMBODIMENTS

The present invention is described in detail in the following.

Definitions

In the present specification, the "room temperature" means about 10° C. to about 25° C.

In the present specification, the "atmospheric pressure" means 1 pressure (1013 hPa).

In the present specification, "about" is defined as ±5° C. for temperature, ±10 min for time, and ±10% for weight, volume, and concentration.

In the present specification, "solid-liquid separation" means an operation of separating solids mixed in a liquid, and encompasses a separation operation by filtration using a filter and a separation operation using a centrifugal separator.

In the present specification, the "carbamic acid derivative" means substituted benzyl- or phenethyl-carbamic acid which is formed by a reaction of m-xylylene diamine, benzylamine, phenethylamine, p-methoxybenzylamine, or p-trifluoromethylbenzylamine with carbon dioxide.

In the present specification, the "bicarbonate" means a salt with substituted benzyl- or phenethyl-amine which is formed by a reaction of m-xylylene diamine, benzylamine, phenethylamine, p-methoxybenzylamine, or p-trifluoromethylbenzylamine with excess carbon dioxide.

(Carbon Dioxide Absorbent of the Present Invention)

The carbon dioxide absorbent of the present invention is a composition consisting of an amine selected from the group consisting of m-xylylene diamine, benzylamine, phenethylamine, p-methoxybenzylamine, and p-trifluoromethylbenzylamine, and water, and has the amine content of 1 to 50 wt % with respect to the total amount.

m-Xylylene diamine, benzylamine, phenethylamine, p-methoxybenzylamine, and p-trifluoromethylbenzylamine are commercially available, readily available, have low volatility and low toxicity, and also have the property of being miscible with water. The present inventors have previously reported that m-xylylenediamine itself is a hydrophobic carbon dioxide absorbent that does not absorb water (moisture in the air) when absorbing carbon dioxide (see Patent Document 3). The carbon dioxide absorbent of the present invention is capable of absorbing only carbon dioxide remarkably more efficiently than m-xylylene diamine itself. Furthermore, by using the carbon dioxide absorbent of the present invention, [3-(aminomethyl)benzyl]carbamic acid formed by absorbing and fixing carbon dioxide in m-xylylene diamine is precipitated as a non-hydrate solid. Therefore, [3-(aminomethyl)benzyl]carbamic acid can be efficiently isolated by a simple operation, solid-liquid separation, without containing water. On the other hand, when a composition consisting of p-xylylene diamine and water was used as a carbon dioxide absorbent, carbon dioxide was efficiently absorbed, but was not precipitated as a solid-liquid separable solid.

The carbon dioxide absorbent of the present invention has an amine content of 1 to 50 wt % with respect to the total amount. When the amine content is less than 1 wt %, a carbamic acid derivative (e.g., [3-(aminomethyl)benzyl]carbamic acid) or bicarbonate formed by absorbing and fixing carbon dioxide in the amine is not sufficiently precipitated, and the recovery efficiency thereof may be extremely lowered. When the amine content exceeds 50 wt %, the absorption efficiency of carbon dioxide is remarkably lowered.

The content of the amine in the carbon dioxide absorbent of the present invention with respect to the total amount is preferably 3 to 30 wt %, more preferably 3 to 15 wt %, further preferably 3 to 6 wt %.

Using the carbon dioxide absorbent of the present invention, the concentration of carbon dioxide in the air per unit volume can be decreased to $1/100$ at maximum.

The carbon dioxide absorbent of the present invention may be used alone at the time of use, or may be used as a composition formulated with known stabilizers and additives.

The carbon dioxide absorbent of the present invention can be used not only in the air but also under a high-concentration carbon dioxide atmosphere.

(Method for Absorption and Fixation of Carbon Dioxide in the Air Using the Carbon Dioxide Absorbent of the Present Invention and Method for Isolation of Carbamic Acid Derivative or Bicarbonate Produced Thereby (Hereinafter Also to be Collectively Referred to as "the Carbon Dioxide Absorption Method of the Present Invention"))

The carbon dioxide absorption method of the present invention includes a step of standing the carbon dioxide absorbent of the present invention in the air at room temperature under atmospheric pressure (under an air atmosphere), thereby allowing the absorbent to absorb and fix carbon dioxide in the air so as to produce a carbamic acid derivative or bicarbonate, which is then precipitated as a solid, and simply and efficiently recovering the carbamic acid derivative or bicarbonate without containing water by solid-liquid separation (carbon dioxide absorption step).

Specifically, for example, the carbon dioxide absorbent of the present invention is placed in a reaction container, the air (carbon dioxide concentration: about 450 ppm) is flowed into the reaction container at room temperature and under atmospheric pressure by MFC, carbon dioxide concentration meter is attached to the exit (outlet) side, and changes in the carbon dioxide concentration (ppm) are observed over time. When the carbon dioxide concentration ceased to change (when the carbon dioxide concentration returned to the initial carbon dioxide concentration), the completion of fixing of the carbon dioxide in the air to the carbon dioxide absorbent of the present invention can be confirmed.

As shown in the below-mentioned Experimental Example, the carbon dioxide absorbent of the present invention can maintain extremely high carbon dioxide absorption efficiency for 4 to 12 hours, depending on the content of the amine relative to the total amount.

Specifically, the m-xylylene diamine in the carbon dioxide absorbent of the present invention absorbs and fixes carbon dioxide in the air, is converted to [3-(aminomethyl)benzyl]carbamic acid which is poorly soluble in water, and is precipitated as a solid. The precipitated solid is solid-liquid separated to conveniently recover [3-(aminomethyl)benzyl]carbamic acid without including water. The recovered [3-(aminomethyl)benzyl]carbamic acid is subjected to the following carbon dioxide generating method to regenerate m-xylylene diamine.

(Method for Generating Carbon Dioxide from Carbamic Acid Derivative or Bicarbonate (Hereinafter to be Also Referred to as "Carbon Dioxide Generating Method of the Present Invention"))

The carbon dioxide generating method of the present invention includes a step of reacting the carbamic acid derivative or bicarbonate obtained by the carbon dioxide absorption method of the present invention with an acid at room temperature, under atmospheric pressure, or heating the carbamic acid derivative or bicarbonate at about 120 to 140° C. to generate carbon dioxide (carbon dioxide generating step). The carbon dioxide generating method of the present invention can be performed according to the method described in Example of Patent Document 3.

Specifically, for example, when using the generated carbon dioxide as a carbon source for an organic synthesis reaction, a reactor that can be connected to the reaction container for the organic synthesis reaction is prepared (the material and the like are not particularly limited), and [3-(aminomethyl)benzyl]carbamic acid is weighed and added thereto. After diluting with a solvent where necessary, an acid is added dropwise or the mixture is heated, whereby the generation of carbon dioxide can be visually confirmed.

When carbamic acid derivatives (e.g., [3-(aminomethyl) benzyl]carbamic acid) or bicarbonates are used in organic synthesis reactions and the like, the amount of carbon dioxide generated varies depending on the total volume of the reactor rather than the amount of reaction substrates. Therefore, the amounts of carbamic acid derivative or bicarbonate and/or acid to be used are desirably set such that carbon dioxide in about twice the total volume of the reactor used is generated.

A solvent is not necessarily required in the carbon dioxide generating method of the present invention. Usable solvents include, for example, alcohols such as methanol, ethanol, and isopropanol, and the like.

The acid to be used in the carbon dioxide generating method of the present invention is not particularly limited. Specifically, for example, dilute hydrochloric acid (e.g., 10% hydrochloric acid, etc.), perchloric acid, an aqueous solution of phosphoric acid (e.g., 85% aqueous solution of phosphoric acid, etc.), oxalic acid, malonic acid, malic acid, glycolic acid, trifluoroacetic acid, and the like. Among these, dilute hydrochloric acid (e.g., 10% hydrochloric acid, etc.) is preferably used.

The amount of an acid to be used is generally 0.01 to 3 mol, preferably 0.1 to 2 mol, per 1 mol of the carbamic acid derivative or bicarbonate. The amount of carbon dioxide to be generated can also be adjusted using the amount of the acid to be used.

In addition, in the carbon dioxide generating method by heating of the present invention, carbon dioxide can be effectively generated simply by heating at about 120 to 140° C. According to the carbon dioxide generating method of the present invention, carbon dioxide can be generated under extremely mild conditions because energy for heating water is not required, as compared with the conventional method requiring heating conditions at a high temperature of 900° C. (specifically, the conventional technique using an aqueous sodium hydroxide solution or aqueous hydroxyethylamine solution as a carbon dioxide absorbent).

According to the carbon dioxide generating method of the present invention, the amine that is regenerated after generation of carbon dioxide can be easily recovered, and can be used as the carbon dioxide absorbent of the present invention by forming an aqueous solution thereof again (regeneration step of the carbon dioxide absorbent of the present invention).

By repeating the above-mentioned series of processes (carbon dioxide absorption step (carbon dioxide absorption method of the present invention), carbon dioxide generating step (carbon dioxide generating method of the present invention) and regenerating step of carbon dioxide absorbent of the present invention), an environment-friendly process that dramatically improves the recovery efficiency of carbon dioxide from the air and remarkably reduces the amount of external energy used when utilizing the recovered carbon dioxide can be achieved.

EXAMPLE

The present invention is explained more specifically in the following by referring to Examples, which do not limit the present invention, and the present invention may be modified without departing from the scope of the invention. Carbon dioxide ($CO_2$) absorption was measured using a $CO_2$ adsorption/desorption device manufactured by Toyoko Kagaku Co., Ltd.

Elemental analysis was performed by using J-SCIENCE LAB JM10.

The concentration of carbon dioxide was measured using a carbon dioxide concentration meter (GC-02) manufactured by God Ability (GA).

The weight was measured using an electronic balance (EK-610i) manufactured by A&D.

The % in the following Examples shows % by weight unless otherwise specified.

As m-xylylene diamine (manufactured by Tokyo Chemical Industry Co., Ltd.), benzylamine (manufactured by Tokyo Chemical Industry Co., Ltd.), phenethylamine (manufactured by Tokyo Chemical Industry Co., Ltd.), p-methoxybenzylamine (manufactured by FUJIFILM Wako Pure Chemical Corporation) and p-trifluoromethylbenzylamine (manufactured by Tokyo Chemical Industry Co., Ltd.), commercially available products can be used as they are.

Example 1

Changes in carbon dioxide concentration (ppm) over time under nitrogen/carbon dioxide mixed gas stream in the presence of an aqueous solution of m-xylylene diamine (content of m-xylylene diamine: 1, 3, 6, 13, 23, 30, 50, or 75 wt %), or m-xylylene diamine itself (100 wt %)
(Experimental Operation)

At room temperature, aqueous solutions of m-xylylene diamine (7.58 mmol) at each concentration (1, 3, 6, 13, 23, 30, 50, and 75 wt %) and m-xylylene diamine itself (7.58 mmol; m-xylylene diamine concentration 100 wt %) as carbon dioxide absorbents were placed separately in cylindrical reaction containers (diameter 5.5 cm, height 9 cm or 13 cm), nitrogen/carbon dioxide mixed gas (carbon dioxide concentration: about 1 vol %) was supplied to the reaction containers by a mass flow controller (MFC) at a flow rate of 25 mL/min, and changes in the carbon dioxide concentration (ppm) in a rectangular container (length 6 cm, width 6 cm, height 13 cm) provided on the exit (outlet) side were measured over time.

A gas flows out as appropriate from the rectangular container in which the carbon dioxide concentration is measured, and the device configuration is free of pressure change.
(Experimental Results)

Changes in the carbon dioxide concentration (ppm) in the rectangular container are shown in Table 1, FIG. 1-1, and FIG. 1-2.

TABLE 1

| | CO2 concentration (ppm) | | | | | | | | |
|---|---|---|---|---|---|---|---|---|---|
| reaction | m-xylylene diamine concentration (wt %) | | | | | | | | |
| time (h) | 1% | 3% | 6% | 13% | 23% | 30% | 50% | 75% | 100% |
| 0 | 10250 | 10274 | 10170 | 10426 | 10270 | 10162 | 10024 | 10052 | 10480 |
| 0.5 | 2614 | 2372 | 1844 | 2492 | 2798 | 2428 | 2548 | 3182 | 5010 |

TABLE 1-continued

| | CO2 concentration (ppm) | | | | | | | | |
|---|---|---|---|---|---|---|---|---|---|
| reaction | m-xylylene diamine concentration (wt %) | | | | | | | | |
| time (h) | 1% | 3% | 6% | 13% | 23% | 30% | 50% | 75% | 100% |
| 1 | 876 | 714 | 318 | 860 | 980 | 1058 | 1446 | 3026 | 3738 |
| 1.5 | 606 | 420 | 108 | 560 | 770 | 862 | 1424 | 3424 | 3536 |
| 2 | 544 | 374 | 118 | 470 | 756 | 836 | 1560 | 3678 | 3222 |
| 2.5 | 550 | 374 | 122 | 384 | 1178 | 858 | 1706 | 3954 | 3256 |
| 3 | 560 | 374 | 122 | 380 | 1148 | 898 | 2172 | 4080 | 3342 |
| 3.5 | 550 | 378 | 128 | 464 | 1246 | 1088 | 3352 | 4200 | 3508 |
| 4 | 554 | 394 | 138 | 480 | 1108 | 1298 | 4428 | 4576 | 3778 |
| 4.5 | 570 | 398 | 158 | 504 | 1142 | 1546 | 5688 | 5710 | 4160 |
| 5 | 566 | 414 | 178 | 510 | 998 | 1856 | 6220 | 8168 | 4476 |
| 5.5 | 584 | 430 | 202 | 520 | 1334 | 2264 | 5802 | 9376 | 4752 |
| 6 | 590 | 444 | 228 | 528 | 1548 | 2818 | 5292 | 9682 | 4962 |
| 6.5 | 586 | 470 | 248 | 540 | 1680 | 3502 | 4980 | 9812 | 5074 |
| 7 | 610 | 500 | 274 | 564 | 1844 | 4486 | 4750 | 9932 | 5274 |
| 7.5 | 620 | 524 | 298 | 610 | 2282 | 5666 | 4394 | 10008 | 5394 |
| 8 | 630 | 554 | 328 | 626 | 4098 | 6662 | 3972 | 10040 | 5626 |
| 8.5 | 626 | 590 | 360 | 654 | 7078 | 7702 | 3514 | 10070 | 5766 |
| 9 | 672 | 530 | 404 | 812 | 9116 | 9148 | 3264 | 10074 | 5838 |
| 9.5 | 710 | 686 | 444 | 1160 | 9776 | 9934 | 3434 | 9970 | 5954 |
| 10 | 772 | 732 | 500 | 2522 | 9880 | 10142 | 3676 | 9884 | 6114 |
| 10.5 | 836 | 800 | 570 | 5872 | 9926 | 10256 | 4092 | 9874 | 6240 |
| 11 | 902 | 902 | 660 | 8772 | 9942 | 10246 | 5076 | 9890 | 6380 |
| 11.5 | 982 | 1012 | 820 | 9890 | 9948 | 10016 | 6196 | 9874 | 6400 |
| 12 | 1098 | 1182 | 1068 | 10150 | 9974 | 9880 | 7090 | 9864 | 6612 |
| 12.5 | 1248 | 1414 | 1546 | 10196 | 9958 | 9800 | 7736 | 9886 | 6756 |
| 13 | 1434 | 1774 | 2528 | 10236 | 9984 | 9762 | 8188 | 9908 | 6826 |
| 13.5 | 1684 | 2328 | 4132 | 10232 | 9984 | 9750 | 8420 | 9914 | 6928 |
| 14 | 1986 | 3122 | 5974 | 10248 | 9978 | 9720 | 8508 | 9932 | 7182 |
| 14.5 | 2434 | 4150 | 7594 | 10232 | 9984 | 9734 | 8454 | 9938 | 7212 |
| 15 | 3010 | 5234 | 8688 | 10228 | 9978 | 9744 | 8204 | 9948 | 7172 |
| 15.5 | 3618 | 6198 | 9394 | 10218 | 9960 | 9740 | 7584 | 9948 | 7342 |
| 16 | 4184 | 7022 | 9368 | 10100 | 9980 | 9736 | 6978 | 9954 | 7472 |
| 16.5 | 4686 | 7762 | 9168 | 10062 | 9944 | 9746 | 6498 | 9970 | 7822 |
| 17 | 5168 | 8506 | 9864 | 10178 | 9950 | 9746 | 6462 | 9958 | 8260 |
| 17.5 | 5626 | 8930 | 10060 | 10178 | 9968 | 9766 | 6938 | 9960 | 8590 |
| 18 | 5946 | 9126 | 10124 | 10148 | 9938 | 9748 | 7736 | 9964 | 8730 |
| 18.5 | 6232 | 9284 | 10150 | 10218 | 9974 | 9724 | 8566 | 9948 | 8928 |
| 19 | 6462 | 9374 | 10154 | 10202 | 9974 | 9730 | 9152 | 9966 | 9150 |
| 19.5 | 6658 | 9446 | 10160 | 10218 | 9934 | 9714 | 9498 | 9960 | 9280 |

From the results in Table 1, FIG. 1-1, and FIG. 1-2, it is confirmed that when the content of m-xylylene diamine exceeds 50 wt % (75 wt % and 100 wt %), a remarkable decrease is found in the carbon dioxide absorption efficiency. In addition, it is confirmed that the carbon dioxide absorbent after the reaction is solidified when the concentration of m-xylylene diamine is in the range of 1 to 100 wt %.

Example 2

Changes in carbon dioxide concentration (ppm) over time under air (carbon dioxide concentration: about 450 ppm) stream in the presence of 6 wt % aqueous solution of m-xylylene diamine
(Experimental Operation)
At room temperature, an aqueous solution of m-xylylene diamine (7.58 mmol) at 6 wt % concentration was placed in a cylindrical reaction container (diameter 5.5 cm, height 13 cm), air (carbon dioxide concentration: about 450 ppm) was supplied to the reaction containers by MFC at a flow rate of 250 mL/min, and changes in the carbon dioxide concentration (ppm) in a rectangular container (length 6 cm, width 6 cm, height 13 cm) provided on the exit (outlet) side were measured over time.
A gas flows out as appropriate from the rectangular container in which the carbon dioxide concentration is measured, and the device configuration is free of pressure change.

Figure 1:
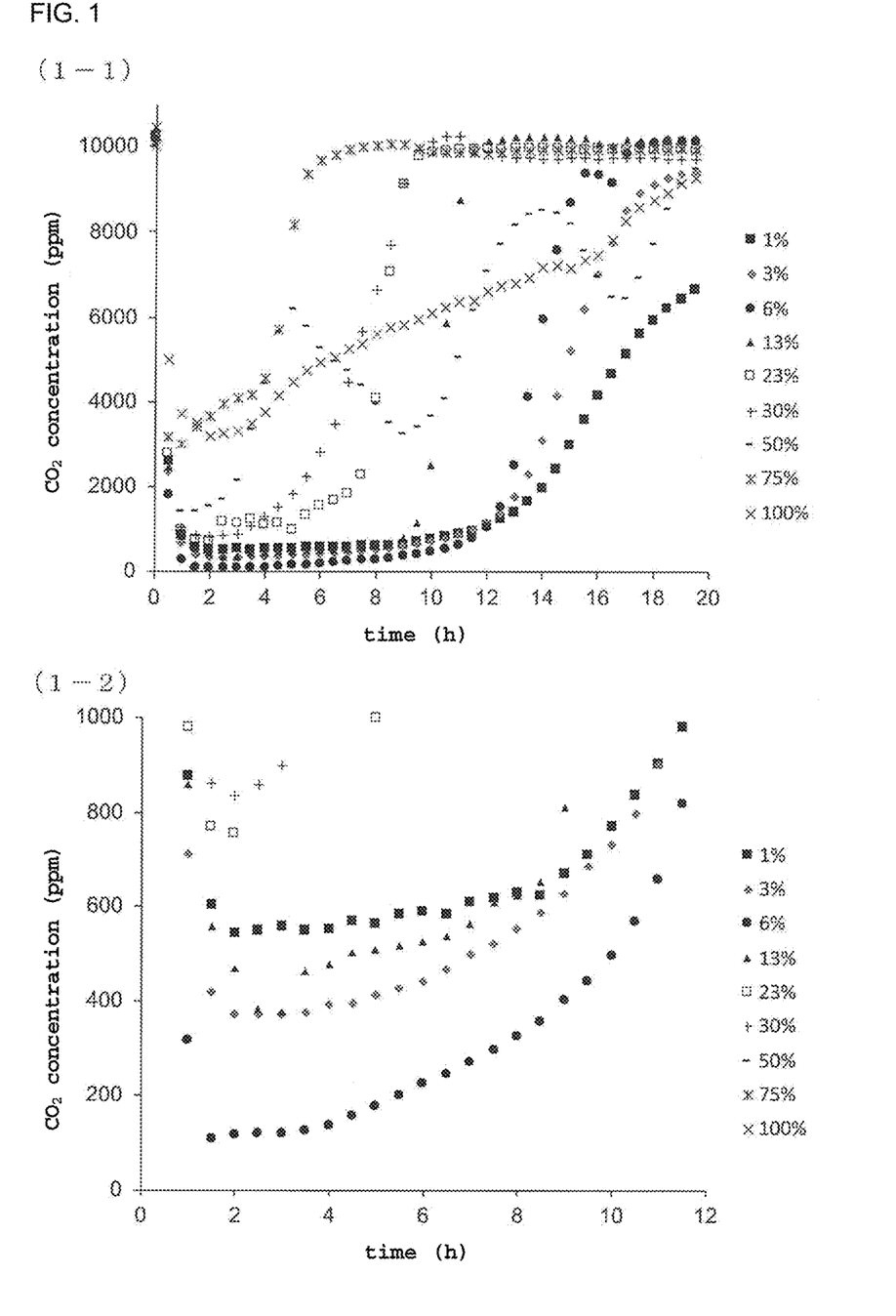
Figure 2:
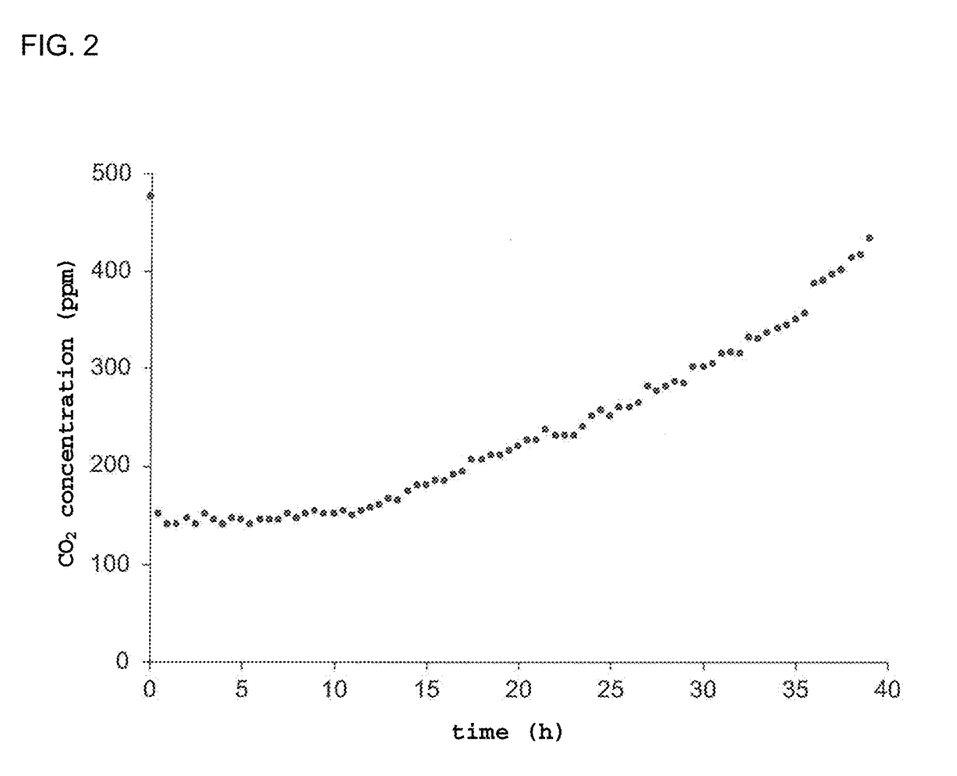
FIG. 2 shows changes in the carbon dioxide concentration (ppm) over time in a rectangular container (length 6 cm, width 6 cm, height 13 cm) provided on the exit (outlet) side.

(Experimental Results)
Changes in the carbon dioxide concentration (ppm) in the rectangular container are shown in Table 2 and FIG. 2.

TABLE 2

| reaction time (h) | CO2 concentration (ppm) |
|---|---|
| 0 | 476 |
| 0.5 | 150 |
| 1 | 140 |
| 1.5 | 140 |
| 2 | 146 |
| 2.5 | 140 |
| 3 | 150 |
| 3.5 | 144 |
| 4 | 140 |
| 4.5 | 146 |
| 5 | 144 |
| 5.5 | 140 |
| 6 | 144 |
| 6.5 | 144 |
| 7 | 144 |
| 7.5 | 150 |
| 8 | 146 |
| 8.5 | 150 |
| 9 | 154 |
| 9.5 | 150 |
| 10 | 150 |
| 10.5 | 154 |
| 11 | 148 |

TABLE 2-continued

| reaction time (h) | CO2 concentration (ppm) |
|---|---|
| 11.5 | 154 |
| 12 | 156 |
| 12.5 | 160 |
| 13 | 166 |
| 13.5 | 164 |
| 14 | 174 |
| 14.5 | 180 |
| 15 | 180 |
| 15.5 | 184 |
| 16 | 184 |
| 16.5 | 190 |
| 17 | 194 |
| 17.5 | 206 |
| 18 | 206 |
| 18.5 | 210 |
| 19 | 210 |
| 19.5 | 214 |
| 20 | 220 |
| 20.5 | 226 |
| 21 | 226 |
| 21.5 | 236 |
| 22 | 230 |
| 22.5 | 230 |
| 23 | 230 |
| 23.5 | 240 |
| 24 | 250 |
| 24.5 | 256 |
| 25 | 250 |
| 25.5 | 260 |
| 26 | 260 |
| 26.5 | 264 |
| 27 | 280 |
| 27.5 | 276 |
| 28 | 280 |
| 28.5 | 286 |
| 29 | 284 |
| 29.5 | 300 |
| 30 | 300 |
| 30.5 | 304 |
| 31 | 314 |
| 31.5 | 316 |
| 32 | 314 |
| 32.5 | 332 |
| 33 | 330 |
| 33.5 | 336 |
| 34 | 340 |
| 34.5 | 344 |
| 35 | 350 |
| 35.5 | 356 |
| 36 | 386 |
| 36.5 | 390 |
| 37 | 396 |
| 37.5 | 400 |
| 38 | 412 |
| 38.5 | 416 |
| 39 | 432 |
| 39.5 | 446 |
| 40 | 456 |

From the results in Table 2 and FIG. 2, it is confirmed that the carbon dioxide concentration can be maintained at 200 ppm or less until 18 hours after the start of the experiment, and the carbon dioxide adsorption activity is exhibited until 40 hours after the start of the experiment. These results support that the carbon dioxide adsorbent of the present invention has high carbon dioxide adsorption capacity.

Example 3

Changes in mass of aqueous solution of m-xylylene diamine at 6 wt % concentration over time under air (carbon dioxide concentration: about 450 ppm) atmosphere (Experimental Operation)

At room temperature, an aqueous solution (test solution) of m-xylylene diamine (7.58 mmol) at 6 wt % concentration was placed in a petri dish with diameter 8 cm, stood in the air, and the amount of increase in mass was measured over time.

In order to consider the water volatile content, a control experiment using only the same amount of water under the same conditions was performed to calculate the volatilization amount of water over time, and a numerical value obtained by subtracting the reduced amount from the change (difference) from the initial value of the test solution was calculated as the mass increase amount (g).

(Experimental Results)

Figure 3:
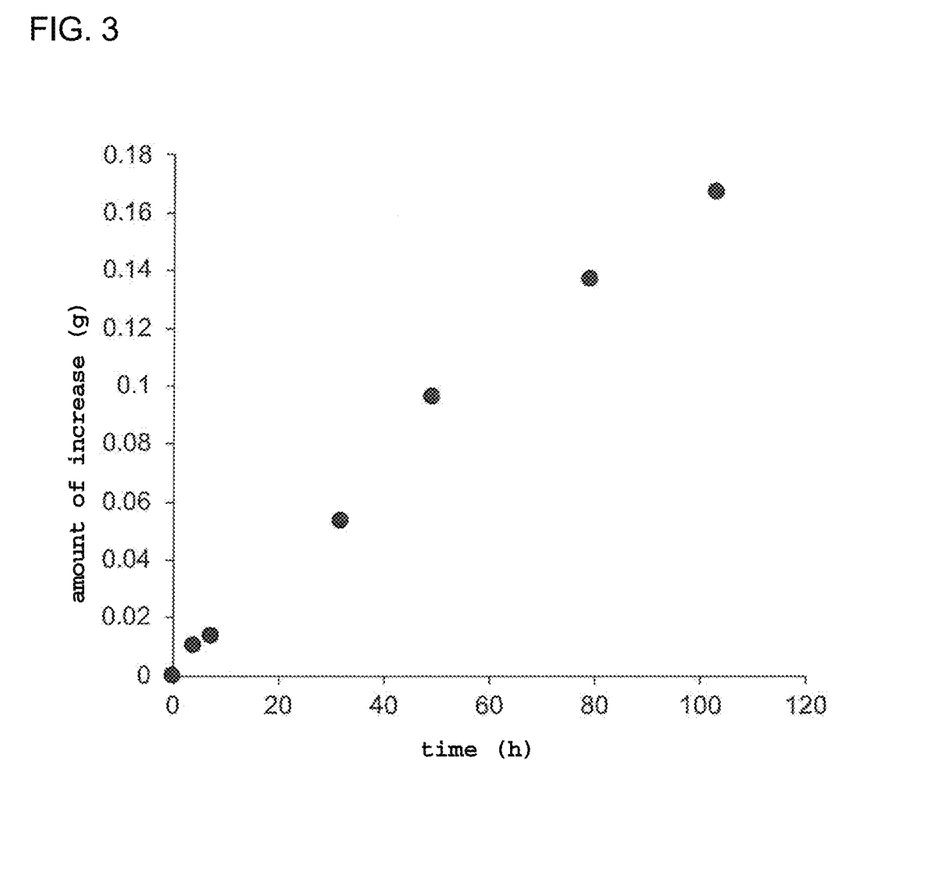
FIG. 3 shows the change in mass (increased grams) over time of an aqueous solution of m-xylylene diamine (7.58 mmol) with 6 wt % concentration which was placed in a petri dish with a diameter of 8 cm and allowed to stand in the air at room temperature.

Changes in the mass (g) of the test solution over time are shown in Table 3 and FIG. 3.

TABLE 3

| [n] entry | reaction time (h) | [X] weight (g) of 6 wt % m-xylylene diamine aqueous solution | [Y] weight (g) of water alone | amount of increase (g) ([Xn]-[X0])- ([Yn]-[Y0]) |
|---|---|---|---|---|
| 0 | 0 | 80.4202 | 92.2589 | 0 |
| 1 | 4 | 79.9368 | 91.7652 | 0.0103 |
| 2 | 7.5 | 79.6508 | 91.476 | 0.0135 |
| 3 | 32 | 78.2125 | 89.9978 | 0.0534 |
| 4 | 49 | 76.9462 | 88.689 | 0.0959 |
| 5 | 79 | 74.8544 | 86.5653 | 0.1367 |
| 6 | 103 | 73.2272 | 84.9056 | 0.1669 |

From the results in Table 3 and FIG. 3, it is confirmed that the mass of the test solution increases in a time-dependent manner only by leaving the solution in the air. These results support that the carbon dioxide adsorbent of the present invention has high carbon dioxide adsorption capacity even in an air atmosphere.

Example 4

Elemental analysis of the solid, which was obtained by filtration of the precipitated solid after the reaction of Example 2 and removing the deposited moisture, was measured. The resulting solid was found to be [3-(aminomethyl) benzyl]carbamic acid [composition formula: $C_9H_{12}N_2O_2$] (941 mg; 7.58 mmol; yield: 69%). The results of three measurements of the resulting solid elemental analysis are shown in Table 4.

TABLE 4

| (%) | C | H | N | O |
|---|---|---|---|---|
| theoretical values | 59.99 | 6.71 | 15.55 | 17.76 |
| measurement results 1 | 59.82 | 6.80 | 15.54 | |
| measurement results 2 | 59.86 | 6.79 | 15.55 | |
| measurement results 3 | 59.86 | 6.79 | 15.55 | |

From the results in Table 4, it was confirmed that [3-(aminomethyl)benzyl]carbamic acid obtained by solid-liquid separation is highly hydrophobic solid rather than hydrate, despite being isolated from water.

Example 5

Changes in carbon dioxide concentration (ppm) over time under air (carbon dioxide concentration: about 450 ppm) stream in the presence of 6 wt % aqueous solution of m-xylylene diamine, benzylamine, phenethylamine, p-methoxybenzylamine, or p-trifluoromethylbenzylamine (Experimental Operation)

In the same manner as in Example 2, at room temperature, an aqueous solution of m-xylylene diamine (MXDA) (7.58 mmol), benzylamine (BZA) (7.58 mmol), phenethylamine (PEA) (7.58 mmol), p-methoxybenzylamine (PMBZA) (7.58 mmol), or p-trifluoromethylbenzylamine (PTFMBZA) (7.58 mmol) at 6 wt % concentration was placed in a reaction container, air (carbon dioxide concentration: about 450 ppm) was supplied to the reaction containers by MFC at a flow rate of 250 mL/min, and changes in the carbon dioxide concentration (ppm) in a rectangular container (length 6 cm, width 6 cm, height 13 cm) provided on the exit (outlet) side were measured over time (0-10 hr).

(Experimental Results)

Figure 4:
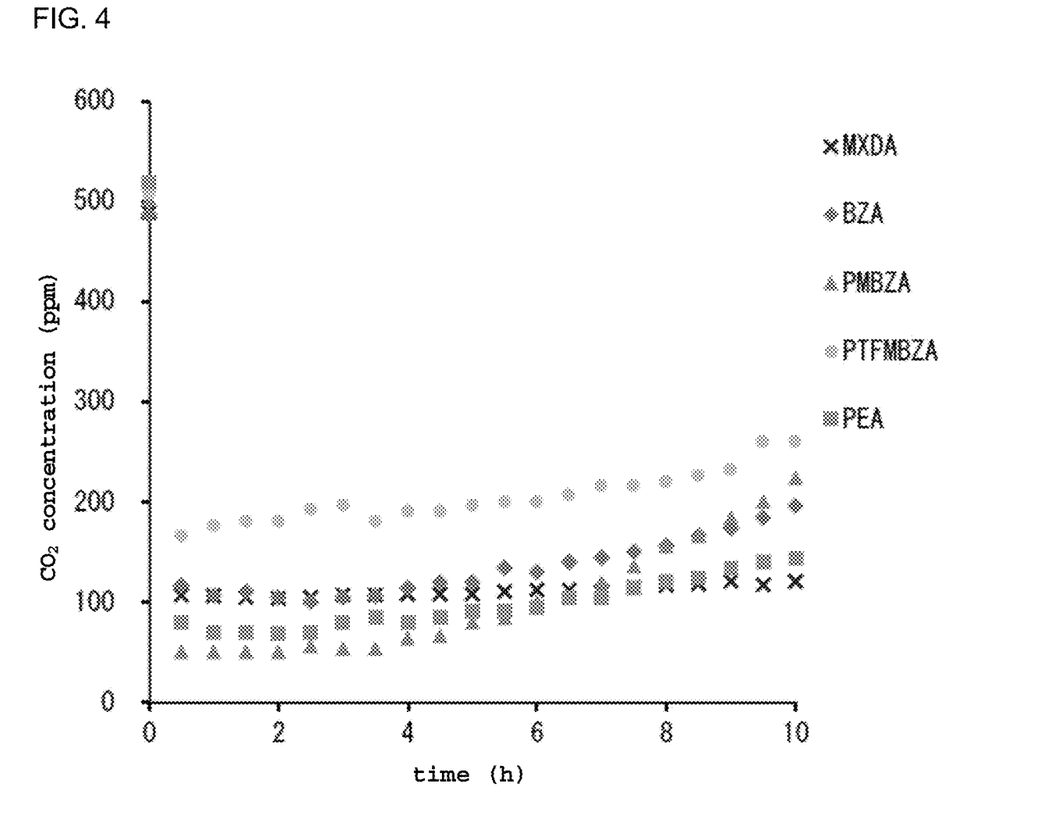
FIG. 4 shows changes in the carbon dioxide concentration (ppm) over time (0-10 hr) in a rectangular container (length 6 cm, width 6 cm, height 13 cm) provided on the exit (outlet) side.

Changes in the carbon dioxide concentration (ppm) in the rectangular container in the presence of an aqueous solution of each amine are shown in Table 5 and FIG. 4.

TABLE 5

| reaction time (h) | concentration (ppm) | | | | |
|---|---|---|---|---|---|
| | MXDA | BZA | PEA | PMBZA | PTFMBZA |
| 0 | 476 | 486 | 518 | 502 | 508 |
| 0.5 | 150 | 116 | 80 | 50 | 166 |
| 1 | 140 | 106 | 70 | 50 | 176 |
| 1.5 | 140 | 110 | 70 | 50 | 180 |
| 2 | 146 | 104 | 68 | 50 | 180 |
| 2.5 | 140 | 100 | 70 | 56 | 192 |
| 3 | 150 | 104 | 80 | 54 | 196 |
| 3.5 | 144 | 106 | 84 | 54 | 180 |
| 4 | 140 | 114 | 80 | 64 | 190 |
| 4.5 | 146 | 120 | 84 | 66 | 190 |
| 5 | 144 | 120 | 90 | 80 | 196 |
| 5.5 | 140 | 134 | 90 | 84 | 200 |
| 6 | 144 | 130 | 94 | 100 | 200 |
| 6.5 | 144 | 140 | 104 | 104 | 206 |
| 7 | 144 | 144 | 104 | 120 | 216 |
| 7.5 | 150 | 150 | 114 | 136 | 216 |
| 8 | 146 | 156 | 120 | 156 | 220 |
| 8.5 | 150 | 166 | 124 | 166 | 226 |
| 9 | 154 | 174 | 134 | 184 | 232 |
| 9.5 | 150 | 184 | 140 | 200 | 260 |
| 10 | 150 | 196 | 144 | 224 | 260 |

From the results in Table 5 and FIG. 4, it is confirmed that, similar to the case of m-xylylene diamine, the carbon dioxide concentration can be maintained up to about 200 ppm until 10 hours after the start of the experiment by using any amine, thus showing good carbon dioxide adsorption activity. In the early stage up to 6 hours after the start of the experiment, amines (phenethylamine and p-methoxybenzylamine) showing higher carbon dioxide adsorption capacity than m-xylylene diamine were also confirmed.

INDUSTRIAL APPLICABILITY

The carbon dioxide absorbent of the present invention has a high carbon dioxide absorption capacity compared to known carbon dioxide absorbents and thus has the advantage of being able to absorb and fix even carbon dioxide, which exists only at a low concentration in the air, efficiently at room temperature and under atmospheric pressure. In addition, since the carbamic acid derivative (e.g., [3-(aminomethyl)benzyl]carbamic acid) or bicarbonate produced (precipitated) after fixation of carbon dioxide is extremely hydrophobic, the carbamic acid derivative can be isolated without containing water by a simple operation (solid-liquid separation). By not containing water, carbon dioxide can be released with high energy efficiency under mild conditions and effectively used as a carbon source. Therefore, according to the present invention, a carbon dioxide absorbent and a method for effectively utilizing carbon dioxide can be provided, which are friendly to the global environment in that carbon dioxide in the air can be efficiently absorbed and fixed and air-derived carbon dioxide can be released timely, while minimizing the use of external energy (heating, pressurization, stirring, etc.).

This application is based on a patent application No. 2021-026634 filed in Japan (filing date: Feb. 22, 2021), the contents of which are incorporated in full herein.

The invention claimed is:

1. A method for generating carbon dioxide, comprising a step of leaving an atmospheric carbon dioxide absorbent consisting of an amine selected from the group consisting of m-xylylene diamine, benzylamine, phenethylamine, p-methoxybenzylamine, and p-trifluoromethylbenzylamine, and water, wherein the amine has a content of 1 to 50 wt % with respect to the total amount, to cause absorption of carbon dioxide in an air and recovering a precipitated carbamic acid derivative or bicarbonate by solid-liquid separation, and a step of reacting the recovered carbamic acid derivative or bicarbonate with an acid or heating the recovered carbamic acid derivative or bicarbonate.

2. The method according to claim 1, wherein the amine is m-xylylene diamine, and the carbamic acid derivative or bicarbonate is a non-hydrate of [3-(aminomethyl)benzyl]carbamic acid.

3. The method according to claim 2, wherein the acid is selected from the group consisting of hydrochloric acid, perchloric acid, phosphoric acid, oxalic acid, malonic acid, malic acid, glycolic acid, and trifluoroacetic acid.

4. The method according to claim 2, wherein the heating is carried out at about 120-140° C.

5. The method according to claim 2, wherein water is added to m-xylylene diamine recovered by the method according to claim 2 to regenerate the carbon dioxide absorbent consisting of m-xylylene diamine and water, wherein the m-xylylene diamine is present in a content of 1 to 50 wt % with respect to the total amount, and it is used as a carbon dioxide absorbent.

6. The method according to claim 1, wherein the acid is selected from the group consisting of hydrochloric acid, perchloric acid, phosphoric acid, oxalic acid, malonic acid, malic acid, glycolic acid, and trifluoroacetic acid.

7. The method according to claim 1, wherein the heating is carried out at about 120-140° C.

* * * * *